Nov. 7, 1939.  J. P. DE ROSE  2,179,085
ADJUSTABLE SEAT
Filed Aug. 13, 1937
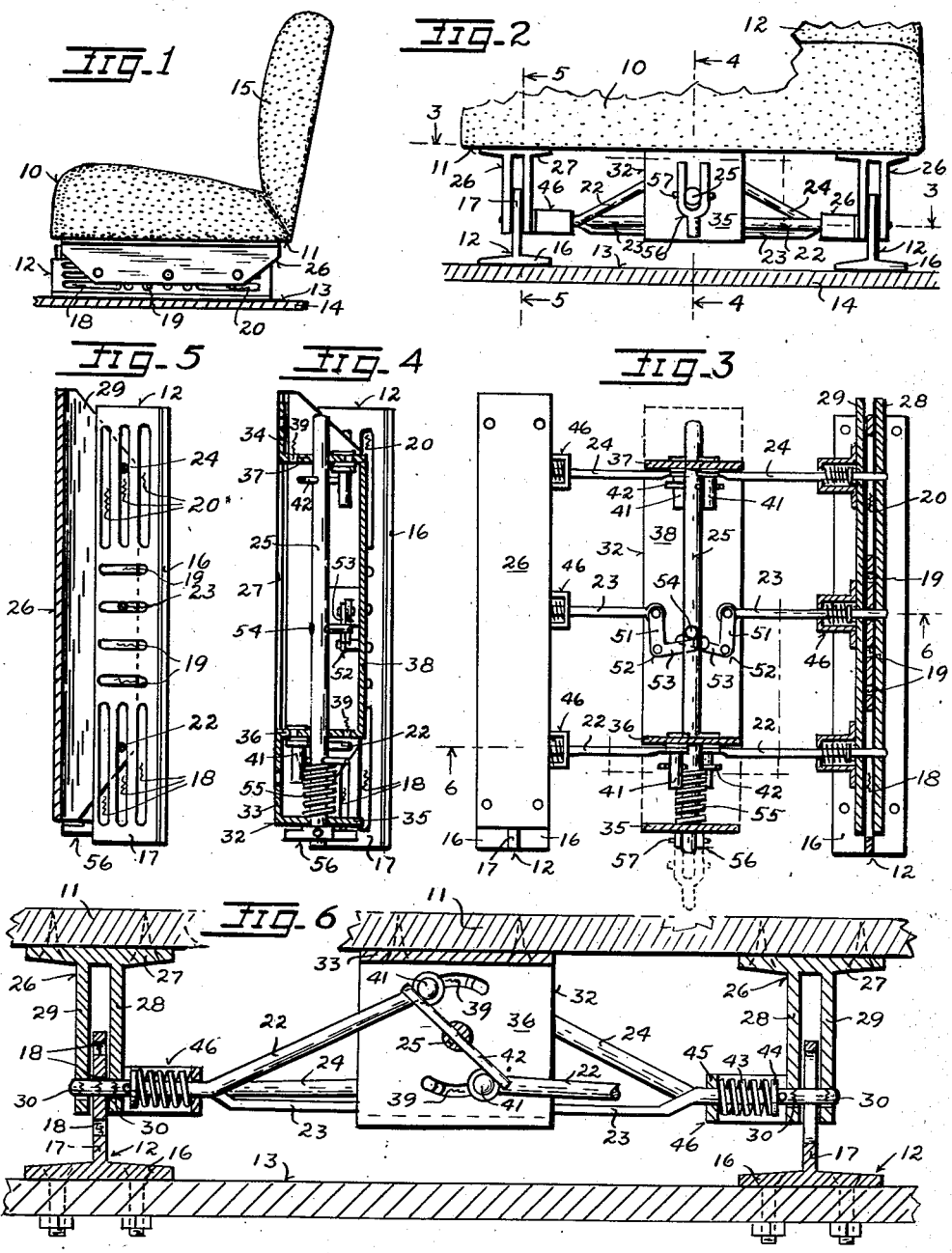
INVENTOR.
JOHN P. DEROSE
BY Henry N. Young
ATTORNEY Patented Nov. 7, 1939

2,179,085

UNITED STATES PATENT OFFICE 2,179,085

ADJUSTABLE SEAT

John P. De Rose, Oakland, Calif.

Application August 13, 1937, Serial No. 158,929

7 Claims. (Cl. 155—90)

The invention relates to an adjustable seat which is particularly adapted for its installation in a motor vehicle for use by the operator of the vehicle, though usable elsewhere.

A general object is to provide a seat unit of which the seat element may be readily and independently adjusted for its height or angularity or fore-and-aft positioning with respect to the base for the seat.

Another object is to provide means whereby members normally supporting the front of the seat element and members normally supporting the rear of the seat element, and members normally retaining the seat element against horizontal displacement over its base may be selectively and temporarily rendered inoperative to permit manual adjustment of the seat element on and with respect to the seat base.

A further object is to provide a seat unit wherein the three sets of members which normally cooperate to secure the seat element in adjusted position are arranged to be selectively freed by the manual manipulation of a common control member.

Yet another object is to provide a particularly simple structure for accomplishing the foregoing objects.

The invention possesses other objects and features of advantage, some of which, with the foregoing, will be set forth or be apparent in the following description of a typical embodiment thereof, and in the accompanying drawing in which, Figure 1 is a side view of a seat unit embodying the features of present invention.

Figure 2 is an enlarged front view of the assembly, the seat element thereof being shown fragmentarily.

Figure 3 is a plan section taken on the broken line 3—3 in Figure 2.

Figures 4 and 5 are sectional views of the seat support structure taken respectively at 4—4 and 5—5 in Figure 2.

Figure 6 is an enlarged sectional view taken at the broken line 6—6 in Figure 3.

As particularly illustrated, the features of the present invention are provided in a seat unit which comprises a seat element 10 mounted on a pair of spaced and mutually parallel base members 12 which are arranged to rest horizontally on a supporting surface 13 such as that provided by the floor 14 of a vehicle (not shown). The present seat element 10 is assumed to be of a usual box type providing a spring cushion and having a rigid bottom 11 by which it may be secured to a support means of the unit, and is provided with a back member 15 unitarily associated with it in any suitable manner.

The present base members 12 comprise like elements of inverted T section having their flanges 16 jointly providing a flat bearing face for engaging the floor surface 13, and their web plates 17 extending in upright planes which are normal to the floor 14. Sets of slots 18 and 19 and 20 are provided in both plates 17, said slots extending transversely through the plates. The slots 19 are provided intermediately of the length of each plate 17, are upright, are laterally spaced in mutually parallel relation, extend between the same upper and lower levels interiorly in the plate, and are of like and uniform width. The sets of slots 18 are provided interiorly in each plate 17 forwardly of the set of slots 19, are longitudinal of the base members 12, are of like length, are spaced in an upright plane in mutually parallel relation, and are of like and uniform width. The sets of slots 20 are generally as the sets of slots 18 but are disposed rearwardly of the sets of upright slots 19.

Pins or bolts 22 and 23 and 24 are mounted on and beneath the seat element 10 for normal engagement in selected slots 18 and 19 and 20 respectively whereby the bolts 22 and 24 may jointly support the seat at an adjusted height and inclination while the bolts 23 secure the seat against its horizontal shifting with respect to the support base provided by the members 12. For adjusting the positioning of the seat with respect to its base, means are provided for selectively withdrawing any one of the pairs of bolts 22 or 23 or 24 from engagement with the plates 17 to permit different positioning adjustments of the seat, said means comprising a control shaft 25 mounted on and beneath the seat and manually actuatable to effect the withdrawal of a selected pair of the bolts through suitable connections with the bolts.

As particularly illustrated, channel members 26 are fixed to and beneath the seat bottom 11 in inverted position to simultaneously and slidably receive the plates 17 in their channels, lateral flanges 27 being included at the bases of the member 26 for providing a sufficient bearing and attaching means with respect to the seat bottom 11. Adjacent the lower edge thereof the inner and outer side plates 28 and 29 of the members 26 are provided with mutually aligned transverse perforations 30 which slidably receive the outer end portions of the bolts 22 and 23 and 24 while the latter are respectively engaged with slots 18 and 19 and 20 of the support plates 17; in this manner, the seat is arranged for support on the bolt portions which span the channel space and rest on the bottoms of the slots 18 and 20 of the plates 17.

The control shaft 25 is mounted in a bracket or hanger member 32 which is secured to and beneath the seat bottom 11, and is disposed in parallel relation to the channel members 26 and midway between them. As shown, the member 32 is shaped from a single strip of material having front and rear base portions 33 and 34 secured to the seat bottom 11 in flat engagement therewith. A terminal portion 35 extends downwardly from the front end of the bracket portion 33, and portions 36 and 37 respectively extend downwardly from the rear of the portion 33 and the front of the portion 34 to carry a transversely offset portion 38 between them. The bracket 32 is a rigid structure, and its upright portions 35 and 36 and 37 provide mutually aligned bearing openings 39 to support the shaft intermediately of the seat bottom 11 and the bracket portion 38, and in a central longitudinal line of the bracket.

It will now be noted that the bolts 22 and 24 extend toward the bracket 32 in upright planes which are parallel to the front of the seat, and that the bracket portions 36 and 37 lie just back of said planes. Arcuate slots 39 having the centers of their arcs in the shaft axis are provided in the bracket portions 36 and 37 at like distances above and below the shaft, and slidably receive and retain the rear end portions of pins 41 which are mounted on the inner extremities of the different bolts 22 and 24, said pins having reduced portions at the slots 39 for preventing their axial removal from the different slots.

The mutual engagement of the different pins 41 with the bolts 22 and 24 and the bracket portions 36 and 37 respectively is such that the pins are arranged to remain parallel to the shaft 25 as they are moved along the slots 39 in said bracket portions. Each pin 41 extends forwardly of the bolt which carries it and lies in the path of movement of an arm 42 which extends radially from the shaft 25 and is arranged for swinging in said path when the shaft is rocked. When the bolts 22 and 24 are operative at the plate 17, the pins 41 thereof engage the ends of the slots 39 which are nearest the members 26 through which the respective bolts extend by reason of the operative engagement of compression springs 43 between spring-seat rings 44 provided on the bolts, and seats 45 provided by bracket members 46 mounted on the inner faces of the plates 27 of the members 26 and perforated at their seat portions 45 to freely receive the bolts therethrough. In this manner, the bolts are constantly and resiliently urged to their operative positions and their pins 41 engage the respective slot ends to limit the operative projection of the bolts.

By particular reference to Figure 6, it will be noted that the bolt 22 which is to the left as a person faces the seat extends to a pin 41 which engages the upper slot 39 of the bracket portion 36 while the other bolt 22 extends to a pin 41 which engages the lower slot 39 of the same bracket portion. With the present arrangement, a clockwise rotation of the shaft 25 is operative to engage the shaft arms 42 behind the pins 41 of the bolts 22 to move the pins along the slots which they engage and so withdraw the bolts from engagement through the plates 28 and 17 to free the seat for its angular swinging to raise or lower its front by disposing the bolt end opposite a higher or lower slot 18 of the plate 17 for its operative entry therein when the shaft is released. It will be understood that said swinging adjustment of the seat is permitted through the sliding engagement of the bolts 23 and 24 in the slots 19 and 20 which they then respectively engage, and that a similar adjustment for the rear of the seat is permitted if the rear bolts 24 are withdrawn from the slots 20.

The pin 41 of the left-side rear bolt 24 engages the lower slot 39 of the bracket portion 37 and the pin of the other bolt 24 engages the upper slot 39 of the same bracket portion; thus, a counter-clockwise rocking of the shaft 25 is arranged to release the rear portion of the seat to permit its adjustment about the engaged bolts 22 and 23 in the manner previously indicated. It will thus be understood that rocking the shaft 25 one way from its normal position and against the resistance of a pair of the springs 43 associated with the withdrawn bolts will release the front of the seat for adjustment thereof, while rocking the shaft the other way will release the rear of the seat for its angular adjustment. If the height of the seat is to be changed without changing the seat angle, the seat would be similarly and independently adjusted at both its front and rear. The lengths of the slots 39 are preferably such that they limit the rocking of the shaft 25 to prevent a complete withdrawal of the bolts 22 and 24 from the openings which they engage in the plates 28; in this manner, a continued operativeness of the present arrangement is assured.

By particular reference to the showing of Figure 3, it will be noted that the inner extremities of the bolts 23 are pivoted to the extremities of corresponding arms 51 of bell-crank levers 52 which are pivoted to the bracket portion 38 at the upper side thereof and have their other arms 53 extending beneath the shaft 25 and forwardly of a pin 54 which extends from the shaft and normally depends vertically therefrom. A compression spring 55 encircles the shaft and is constantly operative between the depending front bracket portion 36 and the forward shaft arms 42 to normally and yieldingly hold the shaft rearwardly in its bearings as far as is permitted by a handle member 56 which is mounted on the shaft portion which extends forwardly of the bracket portion 35. The arrangement is such that a sufficient axially forward displacement of the shaft 25 when the bolts 22 and 24 are operative will engage the pin 54 with the lever arms 53 to rock the levers 52 for withdrawing the bolts 23 from their normal operation in corresponding slots 19 of the base plates 17. It will be understood that the withdrawal of the bolts 23 will permit a fore-and-aft adjustment of the seat while the bolts 22 and 24 cooperatively support the seat at a fixed level and inclination.

The handle 56 is provided for use to manually manipulate the control shaft 25 to free any one of the pairs of bolts 22 or 23 or 24 for permitting the described seat adjustments, is forked to span the shaft end, and is secured to the shaft by means of a pivot pin 57 which is engaged diametrically through the shaft and lies in the plane of the fork near the inner fork end. The handle 56 is normally disposed flat against the front face of the bracket portion 35 in perpendicular relation to the shaft axis, and is frictionally held against the said bracket face through the action of the spring 55; when so disposed, the present handle is manually engageable in the manner of a hand wheel to rock the shaft for releasing either the front bolts 22 or the rear bolts 24 as may be desired.

It will be noted that the present structure and mounting of the handle 56 permits its forward swinging to dispose it in alignment with the shaft. When the handle is so actuated, the free ends of its fork arms are arranged to operate as cams against the opposed face of the bracket portion 35 to force and hold the shaft axially forward for effecting an inoperative disposal of the bolts 23 for the purpose stated. The fully forward disposal of the handle is indicated in Figure 3, it being noted that the fork ends are further from the axis of the pivot pin 57 than is the handle face which normally engages flat against the bracket portion 35 by an amount which insures an inoperative disposal of the bolts 23 when the handle is swung outwardly to axially shift the control shaft 25. It is, of course, essential that the bolt pins 41 be long enough to remain in the planes of action of the corresponding shaft arms 42 when the shaft 25 is pulled forward by the handle 56.

It is to be particularly noted that the present adjustable seat unit is especially adapted for installation in a motor vehicle for the use of the operator of the vehicle. With the base members 13 necessarily fixed to the vehicle floor, the seat may be adjusted to position a particular operator using it in the most effective and comfortable relation to the steering wheel and brake lever and other control elements to be actuated. Also, the present adjustable base assembly for the seat element is particularly shallow whereby a seat thereon may be relatively close to the floor in accordance with present practice, and yet may be adjusted to the fullest necessary degree and by the manipulation of but a single member, the handle 56.

It will, of course, be understood that the number and spacing of the slots 18 and 19 and 20 may be varied without departing from the spirit of the present invention. And it will be further noted that the outer sides 29 of the members 26 which are mounted on and beneath the seat may be omitted without effecting the operativeness of the present arrangement.

From the foregoing description taken in connection with the accompanying drawing, the advantages of the construction and method of operation will be readily understood by those skilled in the art to which the invention appertains. While I have described the features and the principles of operation of a structure which I now consider to be a preferred embodiment of my invention, I desire to have it understood that the showing is primarily illustrative, and that such changes may be made, when desired, as fall within the scope of the following claims.

I claim:

1. In combination with a seat and a floor beneath it, means for supporting the seat on the floor in adjustable relation thereto and comprising a plate member fixed to the floor to extend upwardly therefrom, said member being provided intermediately of its length with a set of like and mutually parallel upright slots spaced horizontally and being further provided with sets of like and mutually parallel horizontal slots at opposite sides of the set of upright slots with the slots of the sets spaced vertically, and horizontally disposed bolts reciprocably carried by the seat and each engageable in a slot of a different set thereof for cooperation to support and retain the seat in fixed adjusted relation to the plate member.

2. In combination with a seat and a floor beneath it, means for supporting the seat from the floor in adjustable relation thereto and comprising a base member resting on the floor and having a plate member rigidly related thereto and extending upwardly therefrom, said member being provided intermediately of its length with a set of mutually parallel upright slots spaced horizontally and being further provided with sets of mutually parallel horizontal slots at opposite sides of the set of upright slots with the slots of the sets spaced vertically, horizontally disposed bolts reciprocably carried by the seat and each normally engaged in a slot of a different said set thereof to cooperatively support and retain the seat in fixed adjusted relation to the base member, and means for actuation to selectively withdraw a said bolt from its engagement in the plate member.

3. In combination with a seat, a seat-supporting means comprising a plate member supported in upright position and provided intermediately of its length with a set of like and mutually parallel upright slots spaced horizontally and further provided at opposite sides of the first set of slots with sets of like and mutually parallel horizontal slots spaced vertically in their sets, a pair of laterally spaced and horizontally disposed bolts reciprocably carried by the seat and respectively engageable in slots of the different sets of horizontal slots for cooperatively supporting the seat in fixed and adjusted angularity to the plate while permitting a fore-and-aft adjustment of the seat along the plate, and a horizontally disposed bolt reciprocably carried by the seat and engageable in a slot of the set of upright slots to retain the seat in adjusted fore-and-aft position on the plate, each of said bolts being arranged for its inoperative disposal independently of the other two bolts.

4. In combination with a seat, a seat-supporting means comprising a plate member supported in upright position and provided with a plurality of like horizontal slots spaced vertically and a plurality of like vertical slots spaced horizontally, a pair of laterally spaced and horizontally disposed bolts reciprocably carried by the seat and each normally engaged selectively in a horizontal slot for cooperation with the engaged other bolt to provide the sole support of the seat on the plate in fixed angular and height adjustment while permitting its horizontal adjustment, and a third bolt reciprocably carried by the seat and normally engaged selectively in a vertical slot to secure the seat in fixed horizontal adjustment on the plate.

5. A structure in accordance with claim 4 having a common bolt control means for actuation to selectively withdraw any one of the three bolts from its operative engagement in the plate member slots for permitting a positioning adjustment of the seat with respect to the plate.

6. A structure in accordance with claim 4 having a common bolt control means for actuation to selectively withdraw any one of the three bolts from its operative engagement in the plate member slots, and wherein said control means comprises a shaft carried on the seat and arranged for its axial or rotative movements from a normal position thereof whereby opposite rotative actuations of the shaft are operative to withdraw different said bolts for their engagement in slots of the plate and an axial movement of the shaft is operative to withdraw the third bolt.

7. A structure in accordance with claim 4 having a bolt control means comprising a shaft carried by the seat and arranged for axial or rotative movements selectively from a normal position thereof, and link-and-lever connections selectively operative between the bolts and shaft such that opposite rotative actuations of the shaft are operative to inoperatively disposed two of the bolts selectively and an axial shifting of the shaft is operative to inoperatively dispose the third bolt.

JOHN P. DE ROSE.